United States Patent
Espinha et al.

(10) Patent No.: US 11,809,859 B2
(45) Date of Patent: Nov. 7, 2023

(54) COORDINATED SOURCE CODE COMMITS UTILIZING RISK AND ERROR TOLERANCE

(71) Applicant: KYNDRYL, INC., New York, NY (US)

(72) Inventors: Rafael de Souza Lima Espinha, Rio de Janeiro (BR); Priscila Vieira de Sousa, Campinas (BR); Silvana Bordini Coca Machado, Campinas (BR); Marco Aurelio Stelmar Netto, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/212,497

(22) Filed: Mar. 25, 2021

(65) Prior Publication Data
US 2022/0308862 A1    Sep. 29, 2022

(51) Int. Cl.
*G06F 8/71*    (2018.01)
*G06N 5/04*    (2023.01)

(52) U.S. Cl.
CPC    *G06F 8/71* (2013.01); *G06N 5/04* (2013.01)

(58) Field of Classification Search
CPC .................................. G06F 8/71; G06N 5/04
USPC ......................................................... 717/170
See application file for complete search history.

(56) References Cited

U.S. PATENT DOCUMENTS

| | | | |
|---|---|---|---|
| 7,490,327 B1 | 2/2009 | Branda | |
| 8,234,636 B2 | 7/2012 | Kawahito | |
| 9,176,729 B2 | 11/2015 | Mockus | |
| 9,292,281 B2 | 3/2016 | Balachandran | |
| 9,442,971 B2 | 9/2016 | Kesavan | |
| 9,710,407 B2 | 7/2017 | Oikarinen | |
| 9,772,874 B2 | 9/2017 | Busaba | |
| 9,921,948 B2 | 3/2018 | Zieder | |
| 11,544,050 B1 * | 1/2023 | Ankit | G06F 8/71 |

(Continued)

FOREIGN PATENT DOCUMENTS

| | | |
|---|---|---|
| WO | 2017106863 A1 | 6/2017 |
| WO | 2017143263 A1 | 8/2017 |

OTHER PUBLICATIONS

Rosen et al, "Commit Guru: Analytics and Risk Prediction of Software Commits", 2015, pp. 966-969, [Online], [Retrieved from internet on Aug. 18, 2023], <chrome-extension://efaidnbmnn-nibpcajpcglclefindmkaj/https://dl.acm.org/doi/pdf/10.1145/2786805.2803183> (Year: 2015).*

(Continued)

*Primary Examiner* — S. Sough
*Assistant Examiner* — Zengpu Wei

(57) ABSTRACT

A processor may receive data regarding a reference source code commit. The processor may identify, using an artificial intelligence model, a first group of source code commits including source code commits similar to the reference source code commit, where each source code commit in the first group is associated with a repository. The processor may determine, using the artificial intelligence model, a first risk associated with implementing a first source code commit from the first group of source code commits. The processor may determine an error budget associated with a first repository associated with the first source code commit. The processor may determine a first time for implementing the first source code commit.

20 Claims, 5 Drawing Sheets

(56) References Cited

U.S. PATENT DOCUMENTS

| | | | |
|---|---|---|---|
| 2007/0174719 A1* | 7/2007 | Inoue | G06F 11/0727 |
| | | | 714/42 |
| 2014/0019196 A1 | 1/2014 | Wiggins | |
| 2014/0258966 A1 | 9/2014 | Duesterwald | |
| 2015/0052501 A1 | 2/2015 | Shani | |
| 2016/0132375 A1 | 5/2016 | Jacobs | |
| 2017/0212829 A1 | 7/2017 | Bales | |
| 2017/0235569 A1 | 8/2017 | Sturtevant | |
| 2018/0307593 A1* | 10/2018 | Assulin | G06F 11/3692 |
| 2018/0314517 A1* | 11/2018 | Iwanir | G06F 8/71 |
| 2019/0026106 A1* | 1/2019 | Burton | G06N 20/00 |
| 2019/0171509 A1* | 6/2019 | Hardy | G06F 3/0689 |
| 2019/0287029 A1* | 9/2019 | Sobran | G06F 8/71 |
| 2020/0005219 A1* | 1/2020 | Stevens | G06F 8/71 |
| 2020/0379879 A1 | 12/2020 | Plotnik | |
| 2021/0263728 A1* | 8/2021 | Farrier | G06Q 10/0635 |

OTHER PUBLICATIONS

Anonymous. "Jenkins. Build great things at any scale." Printed Feb. 22, 2021. 10 pages. Published by Jenkins. https://www.jenkins.io/.

Anonymous. "Tekton. Cloud Native CI/CD." Printed Feb. 22, 2021. 3 pages. Published by Tekton. https://tekton.dev/.

Duvall, "Automate CodeCommit and CodePipeline in AWS CloudFormation." Published Apr. 25, 2016. Printed Dec. 14, 2020. 10 pages. Published by Stelligent. https://stelligent.com/2016/04/25/automate-codecommit-and-codepipeline-in-aws-cloudformation/.

Ernst, et al., "Measure it? Manage it? Ignore it? software practitioners and technical debt." Published Aug. 30, 2015. 11 pages. In ESEC/FSE 2015: Proceedings of the 2015 10th Joint Meeting on Foundations of Software Engineering. pp 50-60. https://doi.org/10.1145/2786805.2786848.

Hammad, "Identifying related commits from software repositories." Published in 2015. 7 pages. In Int. J. Computer Applications in Technology, vol. 51, No. 3. Published by Insider Science. https://www.inderscienceonline.com/doi/pdf/10.1504/IJCAT.2015.069335.

Kawamitsu, et al., "Identifying Source Code Reuse across Repositories Using LCS-Based Source Code Similarity." Published in 2014. 10 pages. In 2014 IEEE 14th International Working Conference on Source Code Analysis and Manipulation. pp. 305-314. Victoria, BC, Canada. Published by IEEE. https://ieeexplore.ieee.org/abstract/document/6975664.

Mell, et al., "The NIST Definition of Cloud Computing," Recommendations of the National Institute of Standards and Technology, U.S. Department of Commerce, Special Publication 800-145, Sep. 2011, 7 pgs.

Pandey, et al., "RAPID: A real time commit protocol." Published Apr. 4, 2020. 11 pages. In Computer Science & Engineering Department, M. M. M. University of Technology. Gorakhpur 273010, India. Published by Elsevier. https://doi.org/10.1016/j.jksuci.2020.04.006.

Skowronski, "Tracking errors after deployments with Rollbar and CircleCI." Published Jun. 19, 2018. Printed Dec. 11, 2020. 10 pages. Published by Circle CI. https://circleci.com/blog/tracking-errors-after-deployments-with-rollbar-and-circleci/.

Tufano, et al., "Deep Learning Similarities from Different Representations of Source Code." Published May 2018. 12 pages. In Proceedings of the 15th International Conference on Mining Software Repositories (MSR '18). pp. 542-553. Association for Computing Machinery, New York, NY, USA. https://doi.org/10.1145/3196398.3196431.

* cited by examiner

COORDINATED SOURCE CODE COMMITS UTILIZING RISK AND ERROR TOLERANCE

BACKGROUND

The present disclosure relates generally to the field of coordinated source code commits, and more specifically to coordinating source code commits based on a risk and error budget.

Computer services rely on software systems that may be updated over time. The updates may be to add new functionalities or because a functionality is not working properly. There may be risks associated with implementing the changes as the source code modifications may damage the services to which they apply. Additionally, several repositories may require the same or similar source code updates.

SUMMARY

Embodiments of the present disclosure include a method, computer program product, and system for coordinating source code commits. A processor may receive data regarding a reference source code commit. The processor may identify, using an artificial intelligence model, a first group of source code commits including source code commits similar to the reference source code commit, where each source code commit in the first group is associated with a repository. The processor may determine, using the artificial intelligence model, a first risk associated with implementing a first source code commit from the first group of source code commits. The processor may determine an error budget associated with a first repository associated with the first source code commit. The processor may determine a first time for implementing the first source code commit.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
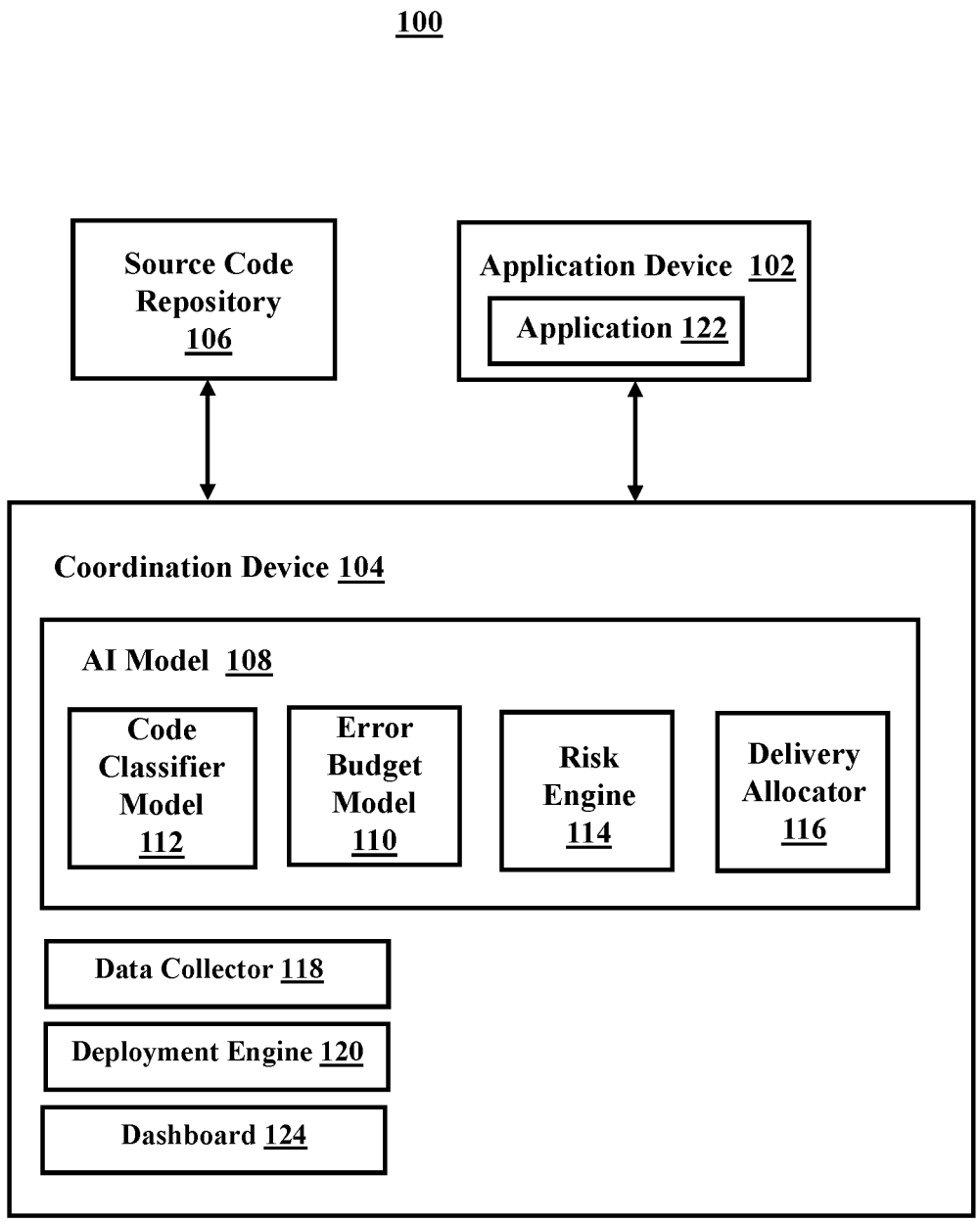
FIG. 1 is a block diagram of an exemplary system for coordinating source code commits, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of coordinating source code commits, and more specifically to coordinating source code commits based on a risk and error budget. While the present disclosure is not necessarily limited to such applications, various aspects of the disclosure may be appreciated through a discussion of various examples using this context.

In some embodiments, a processor may receive data regarding a reference source code commit. In some embodiments, the reference source code commit may be regarding a change in the source code for a project or application. In some embodiments, the reference source code commit may be delivered to the Main branch of a Source Code Management (SCM) tool of an application. In some embodiments, the reference source code commit may relate to development of a new feature, the evolution of an existing feature, or correction of a defective feature. In some embodiments, depending on the code deployment strategy, the reference source code commit may be part of a full version tag of the system. In some embodiments, the reference source code commit may be part of partial code deliveries that can be deployed into the production environment.

In some embodiments, the processor may identify, using an artificial intelligence model, a first group of source code commits including source code commits similar to the reference source code commit. In some embodiments, the first group of source code commits may include the reference source code commit. In some embodiments, each source code commit in the first group may be associated with a repository. In some embodiments, each source code commit may be associated with a repository of source code that is associated with a project or application. In some embodiments, the first group of source code commits may include multiple bits of source code (e.g., that are the same as or similar to [90% the same as, etc.] the reference source code commit) that are implemented across multiple projects and metadata that describes the source code and issues it addresses (e.g., software/service and associated project or application). For example, the reference source code commit may replace a library that is used by multiple SaaS customers, and the first group of similar code may include replacement libraries for each repository of the multiple customers. In some embodiments, the reference source code may change out a configuration file used in systems used by multiple customers, or the received source code commit may relate to an error that is found in source code used across multiple projects.

In some embodiments, the identification of similar source code may involve analyzing the reference source code commit. For example, the reference source code commit may be classified against other code commits in different pools using an artificial intelligence ("AI") model. The AI model may normalize differences between code commits related to different programming languages, code styles, and design patterns. For example, all code commits may be formatted in a common code style. In some embodiments, an abstract syntax tree data structure may be utilized to identify similar source code. In some embodiments, the code that generates the abstract syntax trees may be analyzed to facilitate a comparison between different codes. In some embodiments, the AI model may utilize deep learning to identify features of the reference source code. In some embodiments, the features may represent a best guess about what can be utilized to exploit and reliably assess code similarity for a given task. In some embodiments, the AI model may utilize a stream of identifiers to represent the code. In some embodiments, the AI model may use deep learning to replace manual feature engineering for the task of clone detection. In some embodiments, the source code may be represented at different levels of abstraction, including: identifiers, abstract syntax trees, control flow graphs, and bytecode.

In some embodiments, the identification of similar source code may involve analyzing text that describes the functionality of the source or identifies the source code. For example, natural language processing may be utilized to analyze source code commit messages that are provided by developers to describe the functionality of the source code. In some embodiments, the identification of similar source code may involve generating a similarity index to identify how similar a given code commit is to other code and/or to the reference source code commit. In some embodiments, the reference source code commit may be assigned, based on the code classification, to a code pool that represents code commits that have not been deployed yet. In some embodiments, a new pool may be created if there is no existing pool in which the reference source code commit should be grouped.

In some embodiments, the processor may determine, using the artificial intelligence model, a first risk associated with implementing a first source code commit from the first group of source code commits. In some embodiments, the first risk may relate to an assessment of the potential for harm resulting from an implementation of the first source code commit leading to a system or program (e.g., a project or application) in which it functions becoming nonoperational. In some embodiments, the first risk may relate to an assessment of the likelihood of the nonoperation of the system or program in which the first source code commit functions affecting other systems or programs. In some embodiments, the first risk may relate to a criticality of the system or program in which the first source code commit functions. In some embodiments, the determination of the first risk may involve an assessment of the skills of software development team that developed the first source code commit and/or its related program or system (e.g., the program or system in which the first source code commit functions), the skills of software maintenance team that maintain the related program or system, the root cause of incidents associated with the related program or system, application component dependency map (e.g., describes the libraries, components, and/or services that the original application/service depends on), code dependencies, or attributes of the project database for the related program or system. As an example, an artificial intelligence model may determine a numerical value for the first risk associated with implementation of a particular source code commit based on the number of error tickets generated after the source code commit is implemented and the severity levels of the tickets.

In some embodiments, the processor may determine an error budget associated with a first repository associated with the first source code commit. In some embodiments, each source code commit may be associated with a repository of code associated with a project, application, program, or system in which the source code functions or is to be implemented. In some embodiments, the error budget may relate to how tolerable a repository associated with the source code commit (e.g., a repository containing code for the project associated with the source code commit) is to downtime of the project. In some embodiments, the error budget may reflect an amount of time a system may fail (e.g., maximum amount of time that the technical system may fail without contractual consequences based on a tolerance allowed by a service level agreement). In some embodiments, the error budget may be an operational concept regarding site reliability that assesses the risk that can be taken in managing the operation of a site. For example, the error budget for a project associated with one source code commit may be zero, indicating that the project has no tolerance for downtime of the project. Another project associated with a second source code commit may have an error budget of a few minutes after its contractually allotted time was lessened during times when the system failed. A third project associated with a third source code commit may have an error budget of an hour because its allotted time may not have been reduced by as many system failures.

In some embodiments, the processor may determine a first time for implementing the first source code commit. For example, if the error budget for the first repository is zero, the processor may determine to implement the source code commit when the error budget is refreshed at the beginning of the next month (e.g., the error budget may be associated with a time period). If the first repository has a few minutes in its error budget, the first source code commit may be implemented if it has been determined that the risk associated with implementing the first source code commit is below a threshold. The first time for implementation of the first source code commit may also depend on contextual factors, including whether there are resources available to resolve a problem that may arise when implementing the first source code commit (e.g., are there skilled technicians working at the time of implementation who can resolve issues with the first repository).

In some embodiments, the processor may evaluate both the risk associated with implementing the first source code commit and the error budget associated with the first repository to determine a time (e.g., a first time) for implementation of the first source code commit. In some embodiments, the processor may determine that the first source code commit should not be implemented at any time. In some embodiments, the time for implementing the first source code commit may be determined using an AI model trained to classify the source code commit based on contextual and timing features (e.g., related to risk and/or error budget and the context or timing of the risk and/or error budget) identified from data received about the source code commit and/or a repository associated with it. In some embodiments, the AI model may be trained with historical times to resolution of incidents with many types of source code commits, repositories, errors, or resources available to resolve incidents.

In some embodiments, determining a first time for implementing the first source code commit may involve selecting a source code commit from the first group of source code commits to implement (e.g., the first source code commit). In some embodiments, the selection of the first source code commit may involve evaluating the order in which the source code commits in the first group of source code commits are to be implemented. In some embodiments, the processor may select to implement the source code commit with a repository having the largest error budget before implementing other source code commits from the group. This may optimize the implementation of the source code commits because a change may be tested in/for a repository with greater leeway for errors or downtime than other repositories.

In some embodiments, the processor may select for implementation a source code commit from the first group based on a comparison of the risk associated with implementing it compared to the risk associated with implementing a different source code commit from the first group. In some embodiments, the processor may select the source code commit with a lower risk associated with implementing it before selecting another source code commit from the first group for implementation. In some embodiments, the processor may select for implementation the source code commit having a weighted combination of lower risk and higher error budget (for the respective repository) than other source code commits in the first group that have not yet been implemented. In some embodiments, a user may be able to select the basis by which to order the implementation of the source code commits (e.g., lowest risk first, highest error budget first, combination of lowest risk and highest error budget first, etc.).

In some embodiments, the processor may identify that a threshold time period has passed since the first time. In some embodiments, the processor may determine whether an error associated with the first repository occurred during the threshold time period. For example, a first source code commit may relate to changing a library associated with a speech recognition feature of a voice assistance program utilized by an automated teller system for a bank. The processor may determine that after the library for the speech recognition feature was changed, the automated teller system became nonoperational (during the threshold time period). In some embodiments, processor may determine that no error was detected in the first repository or reported to have occurred in the repository during the threshold time period. In some embodiments, the threshold may be predetermined by a system administrator of the project or application associated with the source code, or the threshold may be learned automatically by identifying via a linear regression the expected error time for that class of source code commit.

In some embodiments, the processor may send a notification about the error in response to determining that an error occurred. For example, there may be a benefit from knowing that a source code similar to other source code crashed an application. Software developers may want to revise their code in the group before deployment. Software developers may decide to remove the code from deployment or keep it for deployment and take the deployment risk.

In some embodiments, the processor may generate a revised first risk associated with implementing the first source code commit. Continuing the previous example, the AI model may receive feedback that an error occurred to the automated teller system after the library associated with a speech recognition feature was changed. The AI model may increase the numerical value given to the risk associated with changing the library based on this detected error. In some embodiments, based on the error detected in the first repository within the threshold time, the AI model may be used to revise the first risk using feedback regarding the error. In some embodiments, the revised first risk may be associated with the remaining source commit(s) that have not yet been implemented in the first group of source code commits. In some embodiments, the revised first risk may be a reduction of the first risk in response to the processor receiving data indicating that no error occurred or the processor not receiving data indicating that an error occurred.

In some embodiments, the processor may update the error budget associated with the first repository based on an occurrence of the error. For example, the processor may determine the duration of the nonoperation of the automated teller system and use the duration to revise the error budget associated with the automated teller system repository. In some embodiments, the updated error budget associated with the automated teller system repository may be utilized to determine a time for implementing other source code commits related to the automated teller system repository. For example, the processor may monitor the automated teller system for possible malfunctions by performing a health check API from the automated teller system at a fixed time interval to determine the application (e.g., automated teller system) availability. In some embodiments, a database may store notifications regarding incidents with the application (e.g., generated by another system that interacts with the application or an individual that noticed that the application was not working properly).

In some embodiments, the processor may determine, based on the occurrence of the error, a revised implementation time for implementing a second source code commit from the first group. In some embodiments, the time interval between implementing one source code commit and another source code commit from the first group of source commits may be reduced when no error is detected after prior source code implementations from the group. In some embodiments, the time interval between implementing one source code commit and another source commit from the first group of source commits may be increased when an error is detected in response to prior source code implementations from the group. For example, the time interval may be reduced in half (or another predetermined fraction) when a successful new source code commit (or N number of) from a group happens. Another possibility is to delay implementation by doubling (or another predetermined multiple) the time interval whenever an error occurs after implementation of a source code change (or N number of).

In some embodiments, the occurrence of the error may be utilized by the processor to determine a time for implementing other source code commits from the first group of source code commits. For example, the AI model may receive feedback that an error occurred to the automated teller system after the library associated with a speech recognition feature was changed. The error occurrence may be utilized to determine a revised time for changing the library in similar speech recognition features of other robotic systems. For example, based on the detected error, the processor may suggest that the remaining library changes be implemented during working hours when technicians for the robotic systems for which the libraries are to be changed are available to make repairs. As another example, if an error is not detected during the threshold time, the processor may determine a revised implementation time for implementing the second source code commit that reduces the time before implementing the second source code commit.

In some embodiments, the processor may receive a second reference source code commit. In some embodiments, the processor may identify, using the artificial intelligence model, a second group of source code commits including source code commits similar to the second reference source code commit. In some embodiments, each source code commit in the second group may be associated with a repository. In some embodiments, the processor may determine, using the artificial intelligence model, a second risk associated with implementing a particular source code commit of the second group. In some embodiments, the particular source code commit may be associated with the first repository.

In some embodiments, the processor may receive a second reference source code commit that is associated with the first repository. For example, the second reference source code commit may relate to changing a configuration file associated with a speech recognition feature of the voice assistance program utilized by the automated teller system for a bank (e.g., the same repository as associated with the first source code commit). In some embodiments, the second group of source code may include multiple bits of source code (e.g., that are the same as or similar to [90% the same as, etc.] the second reference source code commit) that are implemented across multiple projects. For example, the second reference source code commit may replace a configuration file that is used by multiple SaaS customers, and the second group of similar code may include replacement configuration files for each repository of the multiple customers. In some embodiments, the identification of similar source code may involve analyzing the second reference source code commit. For example, the second reference source code commit may be classified against other code commits in different pools using an AI model.

In some embodiments, the second risk may relate to an assessment of the potential for harm resulting from an implementation of the second source code commit leading to a system or program (e.g., a project or application) in which it functions becoming nonoperational. In some embodiments, the second risk may relate to an assessment of the likelihood of the nonoperation of the system or program in which the second source code commit functions affecting other systems or programs. In some embodiments, the second risk may relate to a criticality of the system or program in which the second source code commit functions. In some embodiments, the determination of the second risk may involve an assessment of the skills of software development team that developed the second source code commit and/or its related program or system (e.g., the program or system in which the second source code commit functions), the skills of software maintenance team that maintain the related program or system, the root cause of incidents associated with the related program or system, application component dependency map, code dependencies, or attributes of the project database for the related program or system. As an example, an artificial intelligence model may determine a numerical value for the second risk associated with implementation of the particular source code commit based on the number of error tickets generated after the source code commit is implemented (e.g., after prior/historical occurrences).

In some embodiments, the processor may determine a particular time for implementing the particular source code commit of the second group based on a comparison of the second risk to the first risk. For example, if the first risk associated with implementing the source code commits in the first group is less than the second risk associated with implementing the source code commits in the second group (e.g., based on a comparison of the numerical value associated with the first risk and the numerical value associated with the second risk), the processor may determine to implement the particular source code commit of the second group at a time after the time when the first source code commit of the first group will be implemented. In this way, source code changes associated with lesser risk may be implemented in the first repository before source code changes associated with a higher risk.

In some embodiments, the processor may identify that a threshold time period has passed since the particular time. In some embodiments, the processor may determine whether an error associated with the first repository occurred during the threshold time period. Continuing the previous example, the processor may determine that after the configuration file for the speech recognition feature was changed, the automated teller system became nonoperational (during the threshold time period). In some embodiments, processor may determine that no error was detected in the first repository or reported to have occurred in the repository during the threshold time period (e.g., in the time period from the particular time until the threshold time passed). In some embodiments, the threshold may be predetermined by a system administrator of the project or application associated with the source code, or the threshold may be learned automatically by identifying via a linear regression the expected error time for that class of source code commit. In some embodiments, the processor may send a notification about the error in response to determining that an error occurred.

In some embodiments, the processor may generate a revised first risk associated with implementing the particular source code commit. In some embodiments, the processor may update the error budget associated with the first repository based on an occurrence of the error after the particular source code commit was implemented.

Referring now to FIG. 1, a block diagram of a system 100 for coordinating source code commits is illustrated. System 100 includes an application device 102, a coordination device 104, and source code repository 106. The coordination device 104 is configured to be in communication with the source code repository 106 and the application device 102. The coordination device 104 includes an AI model 108 having an error budget model 110, code classifier model 112, risk engine 114, and delivery allocator 116. In some embodiments, the application device 102 and the coordination device 104 may be any devices that contain a processor configured to perform one or more of the functions or steps described in this disclosure.

In some embodiments, the coordination device 104 receives data regarding a reference source code commit from the source code repository 106. The data regarding the reference source code and other source code commits is collected from the source code repository 106 using the data collector 118. Using the code classifier model 112 of the AI model 108, the coordination device 104 identifies a first group of source code commits including source code commits that are the same or similar to the reference source code from source code repository 106. The AI model 108 uses the risk engine 114 to determine a risk associated with implementing the first source commit. The AI model 108 uses the error budget model 110 to determine an error budget associated with a first repository (e.g., a project or application) associated with the first source code commit. The delivery allocator 116 is used to determine a first time for implementing the first source code commit. The deployment engine 120 of the coordination device 104 communicates the source code change to the application device 102 in order for the code change to be implemented. In some embodiments, the dashboard 124 tracks the timing and deployment status of the source code commits.

In some embodiments, the delivery allocator 116 may identify that a threshold time has passed since the first time. The delivery allocator 116 may use data obtained by the data collector 118 in communication with the application device 102 to determine if an error associated with the first repository (e.g., an error in application 122) occurred during the threshold time period. Based on the occurrence of the error in application 122, a revised first risk associated with implementing the first source code commit may be generated by the risk engine 114. An error budget associated with the first repository may be updated by the error budget model 110 to account for the down time of application 122 resulting from the occurrence of the error that occurred after the first source code commit was implemented. In some embodiments, the deployment allocator 116 may determine a revised implementation time for implementing a second source code commit from the first group of source code commits. In some embodiments, if an error occurred in application 122 after the first source code commit was implemented, the time to implement the second source code commit may be increased to allow a greater delay between implementation of the source code commits (and monitoring of the effects of implementation of the source code commits). In some embodiments, the interval between deployments of source code commits may be decreased if no error is detected after implementation of one or more source code commits from a group of similar source code commits. In some embodiments, a notification about the occurrence of an error may be provided to users on the dashboard 124 of the coordination device 104.

Figure 2:
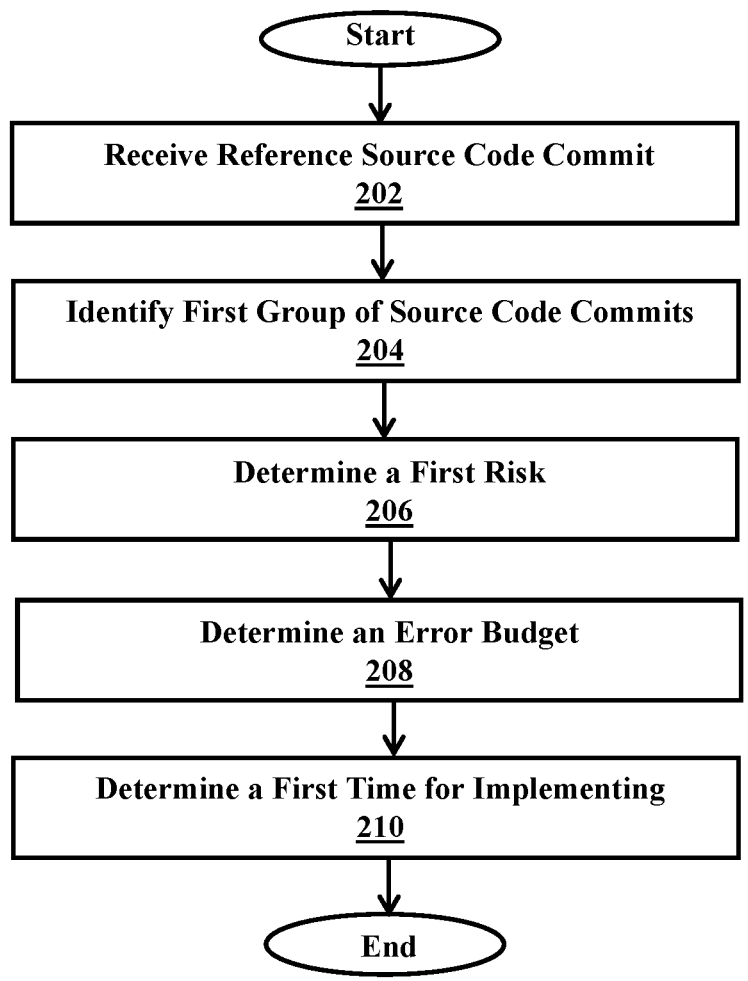
FIG. 2 is a flowchart of an exemplary method system for coordinating source code commits, in accordance with aspects of the present disclosure.

Referring now to FIG. 2, illustrated is a flowchart of an exemplary method 200 for coordinating source code commits, in accordance with embodiments of the present disclosure. In some embodiments, a processor of a system may perform the operations of the method 200. In some embodiments, method 200 begins at operation 202. At operation 202, the processor receives data regarding a reference source code commit. In some embodiments, method 200 proceeds to operation 204, where the processor identifies, using an artificial intelligence model, a first group of source code commits including source code commits similar to the reference source code commit. In some embodiments, method 200 proceeds to operation 206. At operation 206, the processor determines, using the artificial intelligence model, a first risk associated with implementing a first source code commit from the first group of source code commits. In some embodiments, method 200 proceeds to operation 208. At operation 208, the processor determines an error budget associated with a first repository associated with the first source code commit. In some embodiments, method 200 proceeds to operation 210. At operation 210, the processor determines a first time for implementing the first source code commit.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
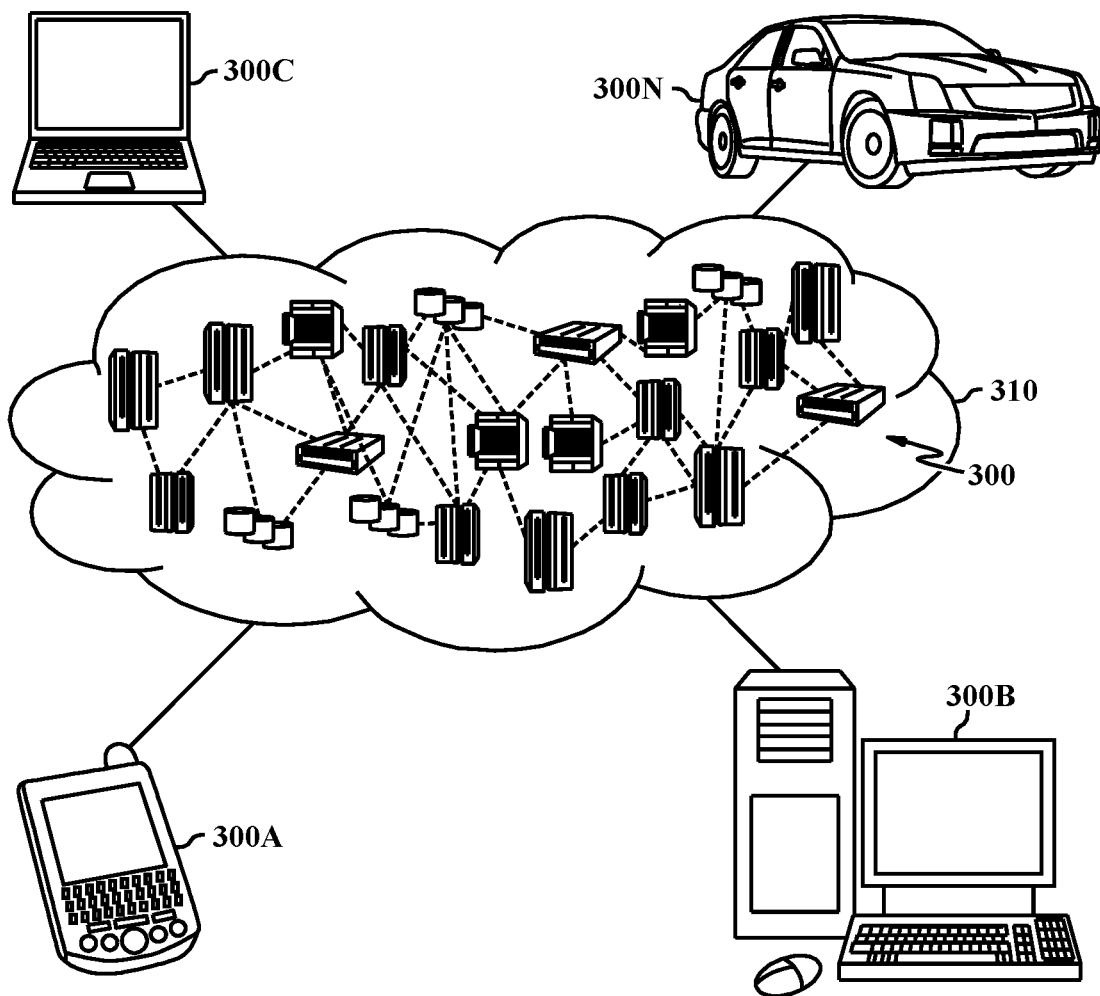
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
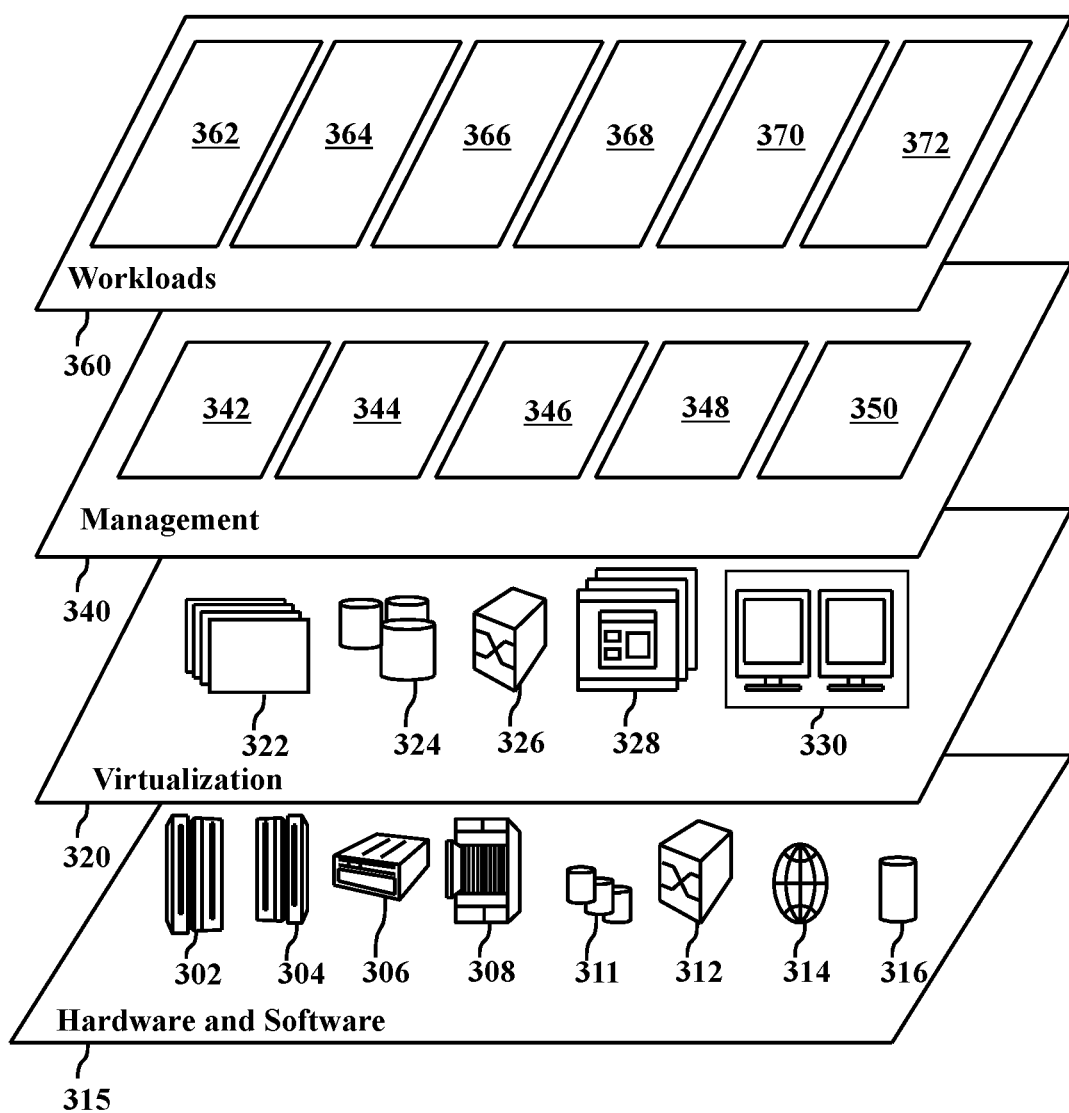
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and coordinating source code commits 372.

Figure 4:
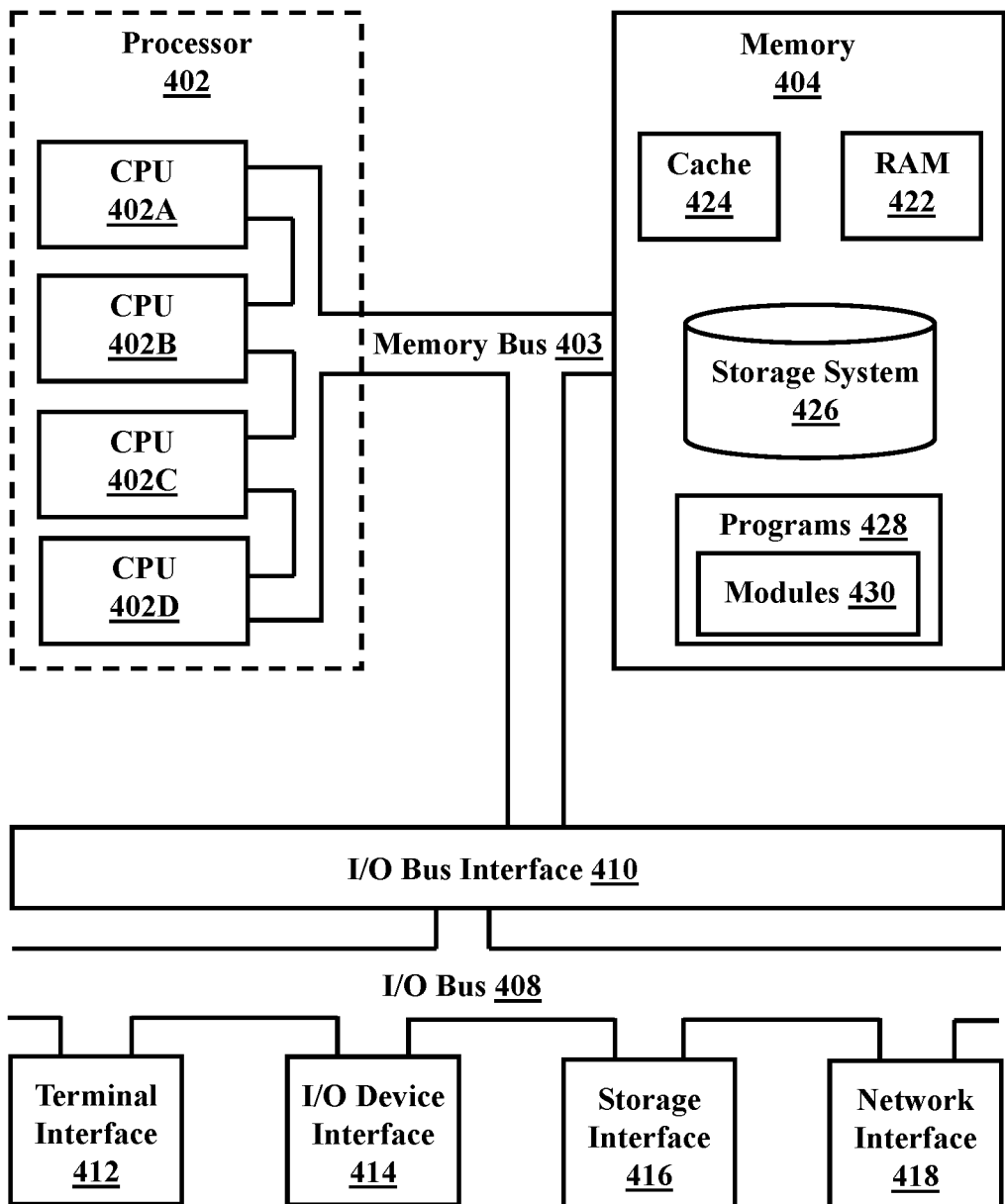
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    receiving, by a processor of a computer device, data regarding a reference source code commit;
    identifying, by an artificial intelligence model executed by the processor, a first group of source code commits including source code commits similar to the reference source code commit, wherein each source code commit in the first group is associated with a repository;
    determining, by the artificial intelligence model, a first risk associated with implementing a first source code commit from the first group of source code commits;
    determining, by the processor, an error budget associated with a first repository associated with the first source code commit; and
    determining, by the processor, a first time for implementing the first source code commit based on the first risk and the error budget.

2. The method of claim 1, further comprising:
    identifying that a threshold time period has passed since the first time; and
    determining whether an error associated with the first repository occurred during the threshold time period.

3. The method of claim 2, further comprising:
    generating a revised first risk associated with implementing the first source code commit.

4. The method of claim 2, further comprising:
    updating the error budget associated with the first repository based on an occurrence of the error.

5. The method of claim 2, further comprising:
    determining, based on the occurrence of the error, a revised implementation time for implementing a second source code commit from the first group.

6. The method of claim 1, further comprising:
    receiving, by the processor, a second reference source code commit;
    identifying, using the artificial intelligence model, a second group of source code commits including source code commits similar to the second reference source code commit, wherein each source code commit in the second group is associated with a repository;
    determining, using the artificial intelligence model, a second risk associated with implementing a particular source code commit of the second group, wherein the particular source code commit is associated with the first repository; and
    determining a particular time for implementing the particular source code commit of the second group based on a comparison of the second risk to the first risk.

7. The method of claim 6, further comprising:
    identifying that a threshold time period has passed since the particular time; and
    determining whether an error associated with the first repository occurred during the threshold time period.

8. A system comprising:
    a memory; and
    a processor in communication with the memory, the processor being configured to perform operations comprising:
        receiving data regarding a reference source code commit;
        identifying, using an artificial intelligence model, a first group of source code commits including source code commits similar to the reference source code commit, wherein each source code commit in the first group is associated with a repository;

determining, using the artificial intelligence model, a first risk associated with implementing a first source code commit from the first group of source code commits;

determining an error budget associated with a first repository associated with the first source code commit; and determining a first time for implementing the first source code commit based on the first risk and the error budget.

9. The system of claim 8, the processor being further configured to perform operations comprising:

identifying that a threshold time period has passed since the first time; and determining whether an error associated with the first repository occurred during the threshold time period.

10. The system of claim 9, the processor being further configured to perform operations comprising:

generating a revised first risk associated with implementing the first source code commit.

11. The system of claim 9, the processor being further configured to perform operations comprising:

updating the error budget associated with the first repository based on an occurrence of the error.

12. The system of claim 9, the processor being further configured to perform operations comprising:

determining, based on the occurrence of the error, a revised implementation time for implementing a second source code commit from the first group.

13. The system of claim 8, the processor being further configured to perform operations comprising:

receiving a second reference source code commit;

identifying, using the artificial intelligence model, a second group of source code commits including source code commits similar to the second reference source code commit, wherein each source code commit in the second group is associated with a repository;

determining, using the artificial intelligence model, a second risk associated with implementing a particular source code commit of the second group, wherein the particular source code commit is associated with the first repository; and determining a particular time for implementing the particular source code commit of the second group based on a comparison of the second risk to the first risk.

14. The system of claim 13, the processor being further configured to perform operations comprising:

identifying that a threshold time period has passed since the particular time; and determining whether an error associated with the first repository occurred during the threshold time period.

15. A computer program product comprising a computer readable storage medium storing instructions that when executed by a processor cause the processor to perform:

receiving data regarding a reference source code commit;

identifying, using an artificial intelligence model, a first group of source code commits including source code commits similar to the reference source code commit, wherein each source code commit in the first group is associated with a repository;

determining, using the artificial intelligence model, a first risk associated with implementing a first source code commit from the first group of source code commits;

determining an error budget associated with a first repository associated with the first source code commit; and determining a first time for implementing the first source code commit based on the first risk and the error budget.

16. The computer program product of claim 15, where the instructions further cause the processor to perform:

identifying that a threshold time period has passed since the first time; and determining whether an error associated with the first repository occurred during the threshold time period.

17. The computer program product of claim 16, where the instructions further cause the processor to perform:

generating a revised first risk associated with implementing the first source code commit.

18. The computer program product of claim 16, where the instructions further cause the processor to perform:

updating the error budget associated with the first repository based on an occurrence of the error.

19. The computer program product of claim 16, where the instructions further cause the processor to perform:

determining, based on the occurrence of the error, a revised implementation time for implementing a second source code commit from the first group.

20. The computer program product of claim 15, where the instructions further cause the processor to perform:

receiving a second reference source code commit;

identifying, using the artificial intelligence model, a second group of source code commits including source code commits similar to the second reference source code commit, wherein each source code commit in the second group is associated with a repository;

determining, using the artificial intelligence model, a second risk associated with implementing a particular source code commit of the second group, wherein the particular source code commit is associated with the first repository; and determining a particular time for implementing the particular source code commit of the second group based on a comparison of the second risk to the first risk.

* * * * *